United States Patent [19]
Yao et al.

[11] 4,285,569
[45] Aug. 25, 1981

[54] CCD DRIVEN INTEGRATED OPTICAL MODULATOR ARRAY

[75] Inventors: Shi-Kay Yao, Anaheim; Richard A. Gudmundsen, Santa Ana, both of Calif.

[73] Assignee: Rockwell International Corporation, El Segundo, Calif.

[21] Appl. No.: 81,419

[22] Filed: Oct. 3, 1979

[51] Int. Cl.³ .............................................. G02B 5/14
[52] U.S. Cl. ............................ 350/96.14; 350/96.11; 357/19
[58] Field of Search .................... 350/96.11, 96.14; 357/19

[56] References Cited
U.S. PATENT DOCUMENTS

| | | | |
|---|---|---|---|
| 3,841,733 | 10/1974 | Ebersole | 350/96.14 |
| 4,003,632 | 1/1977 | Komiya et al. | 350/96.14 |
| 4,094,606 | 6/1978 | Camphausen | 350/96.14 |

*Primary Examiner*—Stewart J. Levy
*Attorney, Agent, or Firm*—H. Fredrick Hamann; Daniel R. McGlynn

[57] ABSTRACT

A CCD driven integrated optical modulator array including an array of chirp grating optical lenses implemented on the surface of an electro-optical crystal such as $LiNbO_3$ or $LiTaO_3$, a plurality of channel waveguides and a thin metal film pattern on the surface of the waveguides for modulating the optical waveform in each channel. The thin metal film form planar capacitors, each of the capacitors being electrically connected to the output circuit of a corresponding semiconductor device, such as a CCD array. The CCD array is implemented on a semiconductor wafer bonded to the electro-optical crystal. Signals in each optical channel in the electro-optical crystal are thereby modulated by corresponding circuit elements associated with corresponding CCD channels implemented on the major surface of the semiconductor wafer.

5 Claims, 5 Drawing Figures

CCD DRIVEN INTEGRATED OPTICAL MODULATOR ARRAY

BACKGROUND OF THE INVENTION

The invention is concerned with electro-optical modulator arrays and particularly modulators for use in integrated optical devices. Light in an optical channel or waveguide is modulated by means of an electric field which functions to change the index of refraction of the media used in forming the waveguide, and therefore change the waveguide mode type, propagation direction, or intensity distribution among a number of channels of the light propagating therein. Generation of such electric fields are generally done external to the electro-optical crystal and additional hardware is required for providing the electric field generating means as well as the control means for governing the amplitude and sequence of the electric field.

One closely related prior art electro-optical modulator array is described in U.S. Pat. No. 3,841,733, which discloses an optical waveguide system for producing a line of modulated radiation data, including a plurality of electro-optical modulators. U.S. Pat. No. 4,003,632 describes a similar structure which incorporates a floating gate as a charge storage structure. Such a floating gate may be associated with a semiconductor memory element, and information written into or read from such memory element by the light propagating in the waveguide exciting or discharging the stored electronic charges. U.S. Pat. No. 4,094,606 describes a plurality of optical waveguides positioned between a common electrode and individual electrodes arrayed along a charge coupled device.

In all of these prior arrays, not much attention is directed to the external electronics necessary to produce and control the electric field and the mechanism of applying the electric field to the integrated optical modulator array in a compact fashion. Such array designs are disadvantageous in many applications where a light, compact modulator array structure is necessary. Prior to the present invention there has not been a simple and easily fabricated integrated structure for modulating light in a large number of electro-optical channels on an integrated optical structure.

SUMMARY OF THE INVENTION

Briefly and in general terms the present invention is concerned with a CCD driven integrated optical modular array consisting of a semiconductor wafer containing a signal processing device such as CCD which is placed in close proximity to the electro-optical wafer. An array of electronic signal output circuit elements are implemented on the semiconductor wafer corresponding to an array of optical modulator channels in the electro-optical wafer. A metallization line connects the output of the signal processing devices on the semiconductor wafer to the surface of the electro-optical crystal so that an electric field is generated at a particular point of the electro-optical crystal depending upon the magnitude of the signal generated by the signal processing device.

The novel features which are considered as characteristic for the invention are set forth in particular in the appended claims. The invention itself, however, both to its construction and its method of operation, together with additional objects and advantages thereof will be best understood from the following description of specific embodiments when read in connection with the accompanying drawings.

REFERENCES

1.
W. K. Burns et al, Appl. Phys. Lett. 30, 28, (1977).

2.
W. K. Burns et al, Appl. Phys. Lett. 29, 790, (1976);
M. Papuchon et al, Appl. Phys. Lett. 27, 289 (1975);
J. C. Campbell et al, Appl. Phys. Lett. 27, 202 (1975);
R. V. Schmidt and H. Kogelnik, Appl. Phys. Lett. 28, 503 (1976);
W. E. Martin, Appl. Phys. Lett. 26, 562 (1975);
Y. Ohmachi and J. Noda, Appl. Phys. Lett. 27, 544 (1975).

3.
G. L. Tangonan et al, Appl. Optics, 20, 3259, (1978);
B. U. Chen and Archie Lee, IOOC'77 Proceedings, 173, (1977).

4.
C. S. Tsai et al, IEEE JQE, QE-14, 513, (1978);
H. Naitoh et al, Appl. Optics, Vol. 17, 101, (1978).

5.
R. V. Schmidt and I. P. Kaminow, Appl. Phys. Lett. 25, 458, (1974);
I. P. Kaminow and J. R. Carruthers, Appl. Phys. Lett. 22, 326, (1973);
J. Noda et al, Appl. Phys. Lett. 25, 308, (1974).

DESCRIPTION OF THE PREFERRED EMBODIMENT

Figure 1:
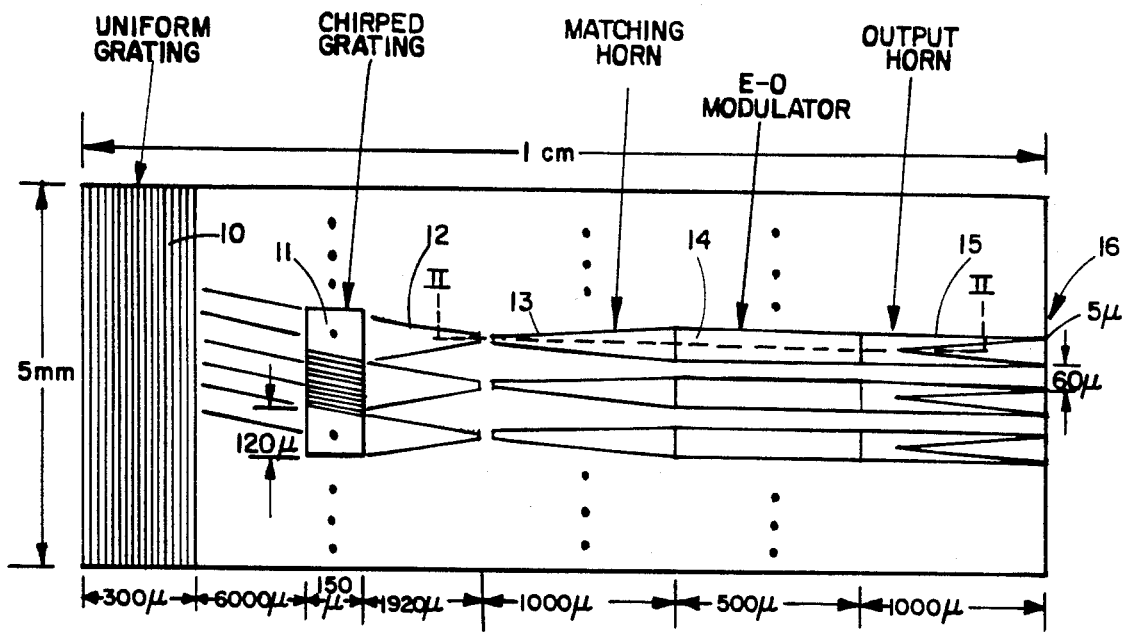
FIG. 1 is a top surface plan view of the electro-optical portion of a wafer incorporating the integrated optical modulator array as taught by the present invention.

Turning now to FIG. 1 there is shown a top plan view of an electro-optical crystal (such as LiNbO$_3$ or LiTaO$_3$) incorporating the integrated optical modulator array as taught by the present invention. To the extreme left of the figure there is shown a uniform grating which consists of a series of parallel lines or bars extending along the major surface of the electro-optical surface. The function of the uniform grating is to convert a ribbon of coherent light traveling in free space such as might be generated by a laser into a guided light wave traveling in an optical waveguide disposed on the surface of the wafer. The uniform grating is preferably approximately five mm in width and 300 microns in length. It may be etched on the crystal surface as surface corrugation, or alternatively it could be deposited as an overlay film with a periodic structure. Such gratings are known in the prior art and permit an efficient conversion from the incident optical beam to a guided optical wave traveling along the surface of the wafer transverse to the parallel strips of the uniform grating.

The presence of grating provides a phase matching condition for the interaction between the incident optical beam and the guided optical wave. In order to achieve efficient coupling, the grating wave-vector K must satisfy $$K = \beta \pm k_m \sin \theta,$$

where $\beta$ is the waveguide mode propagation constant, $k_m \sin \theta$ is the tengential component of the incident optical wave vector. High coupling efficiency occurs when the surface leakage of the optical wave due to the grating satisfies $$\alpha \simeq 1/W \text{ (neper/cm)},$$

where W is the width of the incident optical beam and $\alpha$ is the leakage loss constant of the greating.

Preferably, approximately 6,000 microns away from the edge of the uniform grating is placed an array of chirp gratings. The function of each of the chirp gratings 11 is to form a densely packed optical lens array for the focusing of the guided optical waves into the electro-optical modulator channels. Optical lenses for guiding optical waves are also known in the prior art and may be fabricated from thin film technology such as Luneburg lens technology, geodesic Luneberg lens technology, or grating diffraction lens technologies. Each of these technologies are sufficiently well advanced so as to produce diffraction limited focusing. The thin film Luneburg lens does have a draw back in that it is not fully compatible with waveguides on LiNbO$_3$ surface and the geodesic Luneburg lens is difficult to align with precision optically. Therefore for the purpose of the present invention, the chirp grating lens is at present the prefered structure which can be made easily into a highly packed array as required by the present invention. The chirp grating lens can be made in the same way as the grating input coupler, that is by either etching or deposition on the surface of the optical waveguide. With such structures it is possible to achieve optical throughput efficiency exceeding 90%. It is possible, moreover, that the grating coupler and the chirp grating lens could be made in one photolithographic process with a single mask or with a single E beam fabrication procedure. In any event, the important feature of this type of lens is its relative insensitivity to process variations.

The light emitting from the chirp grating 11 is focused as is shown by the lines 12 into the entrance port of a matching horn 13. The distance between the exit of the chirp grating 11 and the entrance of the matching horn 13 is approximately 1,920 microns. (See reference (1)).

Figure 4A:
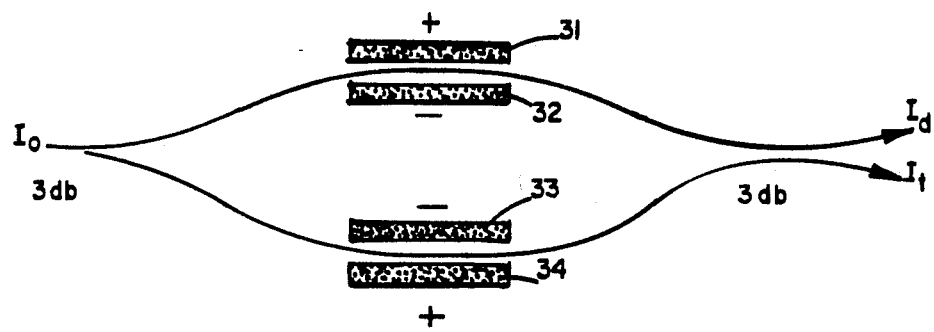
FIG. 4a is a top plan view of a first embodiment of an optical modulator for producing complementary spots using wavefront interference between a pair of channel waveguides.
Figure 4B:
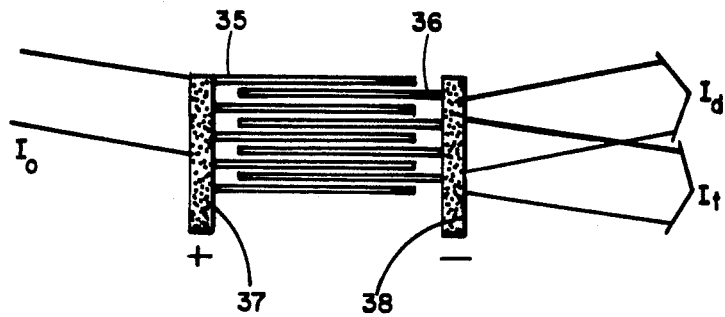
FIG. 4b is a top plan view of a second embodiment of an optical modulator for producing complementary spots using Bragg diffraction.

The configuration of FIG. 1 corresponds to the modulator array using the Bragg diffractor type of electro-optic switch as illustrated in FIG. 4b.

The matching horn has a length of about 1,000 microns and is structured to approximate a parabolic contour for achieving a quasiplanar optical wavefront of finite dimensions which is necessary when using a phase grating type of electro-optical modulator.

The electro-optical modulator 14 according to the present invention provides planar electrodes located on the surface of the channel waveguide. The optical wavefront propagated through the waveguide in the electroded region will then be phase modulated due to the electro-optically induced index of refraction variation.

An alternative implementation of the present invention is to consider a thin film of nitrobenzene; (Kerr cell), as the optical modulator associated with each waveguide. In order to understand how such modulation takes place, a brief review would be useful here.

Modulation is basically concerned with a change in optical dielectric properties by radio frequency electric fields. We assume that the waves being propagated in the dielectric waveguide are infinite plane wave solutions of Maxwell's equations with the components of the dielectric displacement vector D being defined as:

$$D_i = \epsilon_o K_{ij} E_j$$

(in MKS units), with $\epsilon_o = 8.8$ pF/M (permittivity of vacuum)

and $K_{ij}$ the dielectric tensor.

The energy stored in a unit volume of dielectric is $$W = \tfrac{1}{2} E \cdot D = \frac{1}{2\epsilon_o} [(D_1^2/K_{11}) + (D_2^2/K_{22}) + (D_3^2/K_{33})]$$

(assuming the dielectric tensor has been diagonalized by transformation to a principal axis system).

From the above equation, one arrives at the equation of optical velocity surface in an anisotropic dielectric as:

$$B_{11}X_1^2 + B_{22}X_2^2 + B_{33}X_3^2 = 1$$

in the principal axis system, or $$B_{ij}X_iX_j = 1$$

in a general coordinate frame.

The electro-optic coefficients are defined in terms of $B_{ij}$ by:

$$B_{ij}(E) - B_{ij}(o)$$
$$= r_{ij,k}E_k + S_{ij,kl}E_kE_l + \ldots$$
$$= f_{ij,k}P_k + g_{ij,kl}P_kP_l$$

(where P is the polarization vector $P = \epsilon_o \omega E$). The coefficients, and $r_{ij,k}$ and $f_{ij,k}$ are linear or Pockels coefficients, and $S_{ij,kl}$ and $g_{ig,kl}$ are the quadratic or Kerr coefficients. The quadratic effect was observed by Kerr in liquids and glasses. The optical index of refraction tensor can be obtained by inventing the B tensor. A change in optical index of refraction $\Delta n_{ij}$ is therefore derived from the electro-optically induced $\Delta B_{ij}$ such that $$\Delta n_{ij} = \tfrac{1}{2} n_o^3 \, r_{ij,k} E_k$$

where $n_o$ is the pertinent optical index of refraction before the application of electric field.

The basic effect of an electro-optic light modulator is phase modulation. If a beam propagates over a path length L, and the applied (modulating) field is $E_m \sin \omega_m t$, the transmitted beam will be phase modulated with a phase shift $$\eta_x(t) = \eta_o \sin \omega_m t$$

where $$\eta_o = 2\pi L \Delta n_x / \lambda$$

The optical wavefront propagated through the electrode region will be phase modulated due to the electro-optically induced index of refraction variation. In order to convert such phase modulation to amplitude or intensity modulation, three basic schemes may be used:

1. Interferring two optical wavefronts of opposite phase modulation polarity, depending upon the phase modulation depth, so that the intensities of the two output optical channels vary according to the following equation:

$$I_t = I_o \cos^2\left(\frac{2\pi \Delta nL}{\lambda}\right)$$

$$I_d = I_o \sin^2\left(\frac{2\pi \Delta nL}{\lambda}\right)$$

where $\Delta n$ is the induced optical index of refraction, L is the interaction length, and $\lambda$ is the optical wavelength. (See references (2)). FIG. 4a illustrates one version of such device.

2. By Bragg diffraction out of an electro-optical phase grating, so that the optical intensities are: (See references (3)).

$$I_t = I_o \cos^2\left(\frac{\pi \Delta nL}{\lambda}\right)$$

$$I_d = I_o \sin^2\left(\frac{\pi \Delta nL}{\lambda}\right).$$

The Bragg phase grating is formed by electrodes arranged like FIG. 4b.

3. Other types of waveguide optical switches using total internal reflection. (See references (4)). It is noted that these types of modulators behave similarly with the first device requiring only half the modulation index $\Delta n$, and therefore only half of the signal voltage. The parameter $\Delta n$ is related to the signal voltage $V_o$ by the equation:

$$\Delta n_{ij} = \frac{n_o^3}{2} r_{ij,k} \Gamma \frac{V_o}{d},$$

where the factor $\Gamma$ is less than or equal to one, and describes the overlap efficiency between the electric field and the optical waveguide mode.

After the waves pass through the electro-optic modulator, the two output quasi-planar waves are propagated through an output matching horn similar to the matching input horn into two narrow channels (about 5 micron) or two single mode optical channel waveguides. The output matching horn is the superposition of two matching horns each tilted an angle for best reception of each of the modulator outputs (see references (3)).

Figure 2:
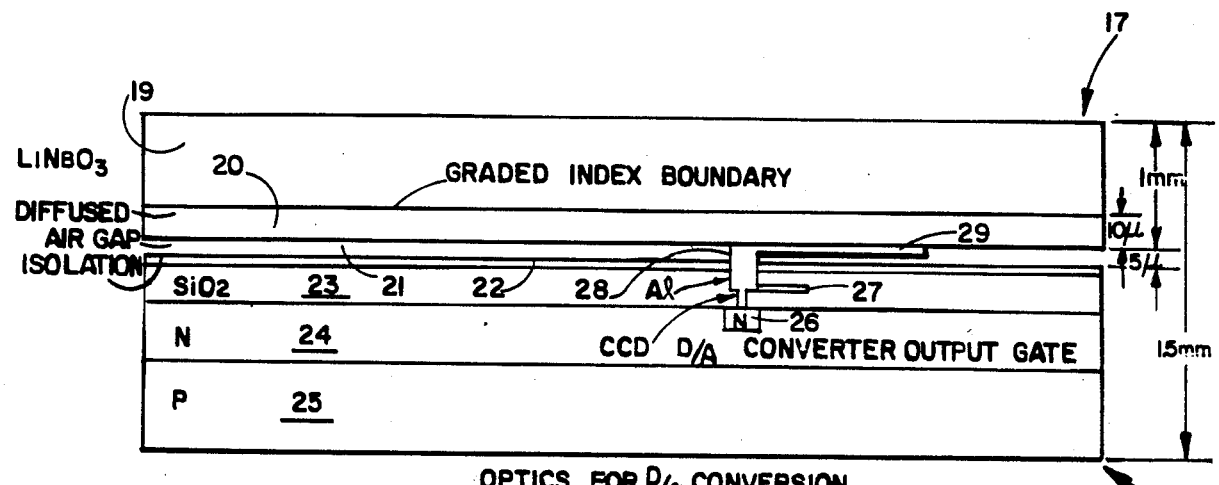
FIG. 2 is a cross-sectional view of the array as shown in FIG. 1 through the II—II plane.

Turning now to FIG. 2, there is shown a cross-sectional view of the electro-optical crystal or wafer and the silicon wafer through the II—II plane shown in FIG. 1. The electro-optical crystal 17 is preferably approximately one mm in thickness and composed of the substrate 19 and a waveguide layer 20 which is formed by the diffusion of an impurity dopant such as titanium or copper or other metals or metal oxides into the substrate 19, or alternatively by out-diffusion of the $LiO_2$ from the substrate 19. With the proper control of the dopant deposition and diffusion process, a single mode optical channel waveguide with a propagation loss as low as 1 db/cm can be produced. For optical wave lengths longer than 6,328 Angstroms the optical damage effect in the electro-optical crystal is not a serious threat to the device performance especially when the optical power involved is relatively small. One alternative crystal to use is $LiTaO_3$ which has an optical damage threshold more than an order of magnitude greater than that of $LiNbO_3$, although the former is preferred for the reason of ease in waveguide preparation. (See references (5)).

Disposed closely adjacent and parallel to the electro-optical crystal 17 is a silicon wafer 18 having a major surface 22 which faces the diffused major surface 20 of the electro-optical crystal and, is separated therefrom by an air gap 21. The silicon wafer is shown in FIG. 2 as being composed of three layers ... a relatively thin top surface layer of $SiO_2$ 23, an adjacent layer of n-type semiconductor material 24, and a lower layer of p-type semiconductor material 25.

The typical dimensions of the various wafers are shown in the FIGURE.

An array of semiconductor electronic devices and in particular CCD cells 26 (shown in highly simplified form) on a silicon wafer 18 is provided. Other semiconductor electronic devices can also be used instead of CCD cells. Also other semiconductor material or electronic material such as GaAs or photoconductors can be used. An output gate 27 preferably consisting of a metal strip making physical and electrical contact with the device 26 is also provided. Such an output strip 27 corresponds to only one in a plurality or array of substantially identical CCD cells on the surface of the silicon wafer. For a plurality of channels in the electro-optical crystal there are corresponding pluralities of CCD devices (such as 26) and output gates (such as 27) located on the surface of the silicon wafer. The specific output gate 27 shown in FIG. 2 is merely a single representation of one of such plurality of such output gates in an array. Making contact with the output gate 27 is a metal conductor 28 preferably applied by the means of metal plating which connects the thin film metal output gate 27 with a corresponding metal element 29 located on the surface of the electro-optical crystal. As we have pointed out previously, the element 29 forms a portion of the electro-optical modulator and functions to create an electric field in the diffused region of the electro-optical crystal 17. The conductor 28 makes contact between the output gate 27 on the silicon wafer 18 and element 29 on the electro-optical wafer 17, and therefore makes a direct correspondence between a specific CCD device on the silicon wafer and a specific electro-optical modulator on the surface of the electro-optical crystal.

In the preferred embodiment according to the present invention, there are a plurality of electro-optical modulators corresponding to different optical channels on the surface of the electro-optical crystal, and a corresponding plurality of semiconductor electronic devices corresponding to different electronic signal channels on the surface of the silicon wafer. There is a one-to-one correspondence between the electronic signal channels on the silicon wafer and the optical channels on the electro-optical crystal.

The preferred method of fabrication according to the present invention is that the two wafers (i.e., the electro-optical crystal wafer and the silicon wafer) are first independently produced. The particular electro-optical integrated optic structure required and the specific integrated circuit are formed on the two respective wafers. The wafers are then placed with the active major surfaces facing one another and are closely aligned so that the channels of the electro-optical crystal correspond and make electrical contact with corresponding electronic channels in the silicon wafer.

Figure 3:
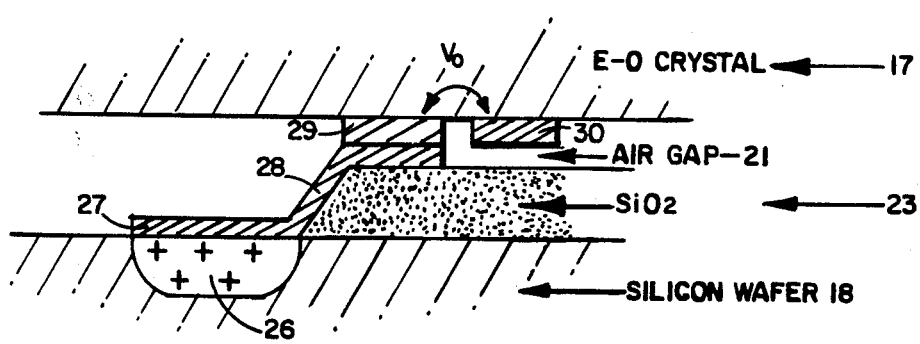
FIG. 3 is an enlarged cross-sectional view of the output portion of the CCD array on the surface of a silicon wafer together with the planar capacitor formed on the surface of the electro-optical crystal for forming a field therein.

FIG. 3 is a highly simplified diagram of an enlarged portion of the electrical connection between the silicon wafer and the electro-optical crystal showing how a field is created in the electro-optical crystal by means of a charge on the surface of the silicon wafer. We first note that there is a small air gap 21 approximately 5 microns in distance between the electro-optical crystal 17 and the silicon wafer 18, as is shown in FIG. 2.

The charge storage region CCD device 26 (sometimes called a "floatinggate") is shown in the FIGURE forming a surface portion of the silicon wafer 18. As has been described with referent to FIG. 3, an output strip or gate 27 contacts the CCD device 26. A metal conductor 28 disposed over an $SiO_2$ layer 23 on the silicon wafer 18 contacts the gate 27 and provides an electrical connection between the CCD device 26 and a corresponding metal element 29 on the surface of the electro-optical crystal 17. Therefore, the surface charge of the CCD is connected to one of the electrodes (29) of the planar capacitor formed by electrodes 29,30 of the electro-optic modulator. Since the modulator electrodes form a planar dielectric capacitor, the CCD structure in the present invention uses the electro-optic capacitor instead of the gate oxide capacitor in a conventional CCD structure. As the CCD charge is deposited on the electro-optic capacitor, a voltage is developed across the electro-optic capacitor according to $V_o = Q/C$ where Q is the deposited charge and C is the capacitance. This voltage $V_o$ across the electro-optic modulator electrodes 29,30 is responsible for the modulation of the guided optical wave.

Finally, FIG. 4a is a top plan view of a first embodiment of an optical modulator for producing complementary spots using wavefront interference between a pair of channel waveguides.

FIG. 4b is a top plan view of a second embodiment of an optical modulator for producing complementary spots using Bragg diffraction.

It will be obvious to those skilled in the art that the device according to the present invention can be manufactured with various integrated optical and semiconductor technologies and different combinations of known process steps, and that the preferred embodiments illustrated here are merely exemplary. The depth of penetration of the various zones and regions and in particular the configuration and distance between the active zones of the integrated optical and semiconductor devices, as well as the concentrations of dopant species, and/or their concentration profiles, can be chosen depending upon the desired properties. These and other variations can be further elaborated by those skilled in the art without departing from the scope of the present invention.

The present invention is also not restricted to the specific electro-optical and semiconductor materials and circuits described. For example, it may be pointed out that semiconductor materials other than silicon, for example $A_{III}$-$B_V$ compounds, may be used. Furthermore, the conductivity types in the embodiment may be interchanged and corresponding to such change, the polarity of the respective operating voltages adapted. Moreover, the voltage level and the static or dynamic nature of the signals applied to the various terminals and gates of the device, as well as the voltage sources, may be suitably selected as desired for a particular application.

Without further analysis, the foregoing will so fully reveal the gist of the present invention that others can, by applying current knowledge, readily adapt it for various applications without omitting features that, from the standpoint of prior art, fairly constitutes essential characteristics of the generic or specific aspects of this invention, and, therefore, such adaptations should and are intended to be comprehended within the meaning and range of equivalence of the following claims.

We claim:

1. An optical array comprising:
   a substrate having a major surface;
   a plurality of individual optical waveguides capable of propagating light, the waveguides being formed from a material which modulates the propagating light in response to an electric field and being implemented on a major surface of said substrate;
   a uniform grating which functions to convert an incident optical beam into a guided optical beam into a guided optical wave traveling in said optical waveguides along said major surface of said substrate;
   a chirped grating spaced from said uniform grating for focusing said guided optical wave into said waveguides;
   means for modulating the propagating light in each of the individual waveguides, comprising a first and a second spaced apart electrode disposed on the surface of said substrate for creating an electric field in each of said waveguides;
   a body of semiconductor material disposed adjacent said substrate; and
   circuit means implemented on said body of semiconductor material for providing said predetermined quantities of electric charge to said means for modulating.

2. An optical array as defined in claim 1, wherein said circuit means comprise a plurality of floating gates of electrically conductive material for storing a predetermined quantity of electric charge, said gates being disposed on said body of semiconductor material and electrically connected with respective ones of said means for modulating the propagating light; and 3. An optical array as defined in claim 1, wherein said substrate comprises an electro-optical crystal.

4. An optical array as defined in claim 1, wherein said means for modulating the propagating light comprises planar electrodes located on one surface of said optical waveguide.

5. An optical array as defined in claim 1, wherein said optical waveguides include a matching horn portion disposed adjacent to said chirped grating.

* * * * *

UNITED STATES PATENT AND TRADEMARK OFFICE
CERTIFICATE OF CORRECTION

PATENT NO. : 4,285,569
DATED : August 25, 1981
INVENTOR(S) : Yao et al

It is certified that error appears in the above-identified patent and that said Letters Patent are hereby corrected as shown below:

In column 3, line 20, please delete [greating] and insert --grating--.

In column 4, line 49, please delete [ω] and insert --χ--.

In column 8, lines 34 and 35, claim 1, please delete [beam into a guided optical], second occurrence.

Signed and Sealed this

Twelfth Day of January 1982

[SEAL]

Attest:

GERALD J. MOSSINGHOFF

Attesting Officer    Commissioner of Patents and Trademarks